Patented Nov. 15, 1949

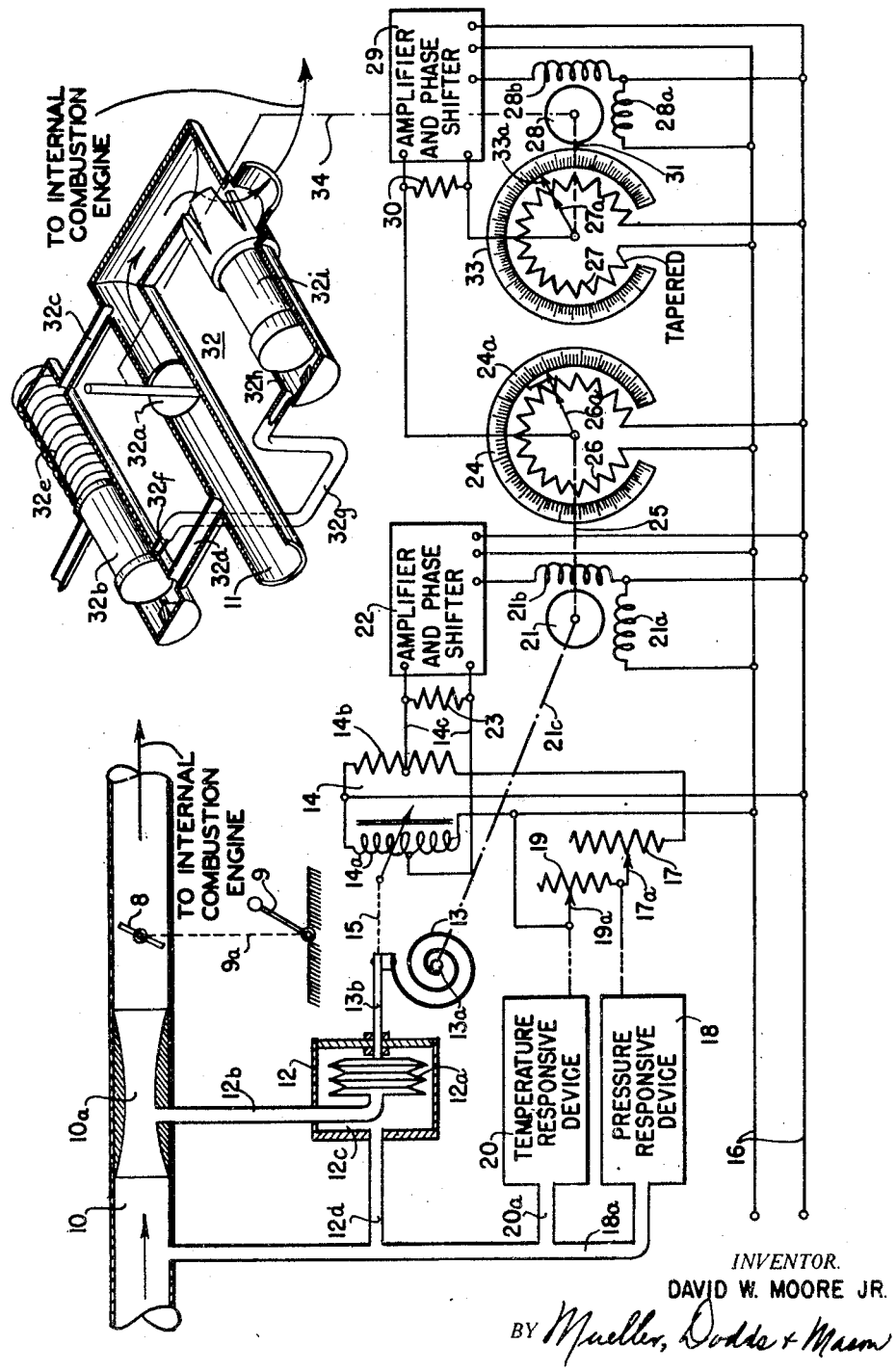

2,488,221

UNITED STATES PATENT OFFICE 2,488,221

FUEL-AIR RATIO CONTROL SYSTEM AND ELASTIC FLUID-MASS FLOW MEASURING SYSTEM USEFUL THEREIN

David W. Moore, Jr., New York, N. Y., assignor to Fairchild Camera and Instrument Corporation, a corporation of Delaware Application March 16, 1945, Serial No. 583,094

13 Claims. (Cl. 261—69)

This invention relates to fuel-air ratio control systems and elastic fluid-mass flow measuring systems useful therein and, while it is of general application, it is particularly suitable to the measurement of the air-mass flow to an aircraft internal combustion engine and to the control of the fuel-air ratio of the input thereto.

Certain prior art arrangements have been directed toward automatically controlling the air-mass and fuel-mass inputs to an aircraft engine to obtain optimum operating conditions for various throttle or power requirements settings. In general, these systems have comprised mechanical devices for sensing a number of basic parameters, for example the velocity of air at the engine intake, its temperature and pressure, and utilizing the effects produced by these devices to control the fuel-mass flow. Such systems are capable of approximately maintaining a desired fuel-air ratio only within certain rather wide limits. However, for satisfactory performance, internal combustion engines require an accurately predetermined variable fuel-air ratio over their entire ranges of operating conditions and it has been necessary, therefore, to add additional compensating devices to produce the desired results. Such compensating devices have decidedly increased the complexity of the systems and many of them are capable of effecting only approximate empirical compensations. In addition, there has generally been considerable interaction between the devices for sensing the basic parameters, or between one or more of such devices and one or more of the compensating devices, which may easily impair the accuracy and stability of the system.

Such prior art systems have usually controlled the fuel-input valve by balancing or comparing the differential-pressure across an orifice or constriction in the air-intake conduit against that across an orifice in the fuel-intake conduit. In the case of fuel such as gasoline, which is relatively inelastic, the density is relatively constant and the relation is a simple one. In the case of air, however, the density changes with pressure and temperature so that the air-mass flow is not the same simple function of differential head as that for fuel; that is, the air-mass flow and fuel-mass flow follow substantially different characteristic curves. In the arrangements of the prior art, it has been attempted to match these divergent characteristics of the air-flow metering device and the fuel-flow metering device by cut-and-try methods, such as by altering the actual metering device for either the air or fuel, or both, as by the addition of compensating orifices in parallel or series with the main orifices. However, these compensating devices are all empirical and, because of the many inter-dependent factors involved, it has been impossible to compute them accurately, over the entire range of operating conditions, so as to obtain an accurately predetermined relationship between the characteristics of the two metering devices. Furthermore, it is sometimes desired to vary the fuel-air ratio, that is, impart a predetermined mismatching of the characteristics of the air-metering and fuel-metering devices. In contrast to such systems, the present invention is directed to a system in which the characteristic of each metering device is accepted, whatever its nature so long as it is stable and reproducible, and the comparison ratio or linkage between the differential-pressure or velocity factor of the air-mass flow and that of the fuel-mass flow is varied, preferably electrically, to compensate for the differences in their characteristic curves.

Further in such prior art devices of the type described, the differential-pressure device utilized for deriving the velocity factor generally has had an irregular response characteristic which deviates considerably from the ideal square-root relation between differential pressure and velocity and these irregularities have introduced complexities into the system which had to be compensated at some other point.

It is an object of the invention, therefore, to provide a new and improved fuel-air ratio control system for controlling the fuel-mass input to an internal combustion engine under a wide range of variable operating conditions while maintaining accurately a predetermined fuel-air ratio over such range.

It is another object of the invention to provide a new and improved elastic fluid-mass flow measuring system which overcomes the disadvantages and limitations of such measuring systems of the prior art and is effective to develop an effect representative of the fluid-mass flow which is substantially independent of irregularities in the characteristic of the differential-pressure device.

In accordance with the invention, a system for controlling the fuel-air ratio of the input to an internal combustion engine under variable operating conditions comprises an air-intake conduit for the engine, a deflectable differential-pressure device connected with the conduit and responsive to the air flow therethrough, and an adjustable resilient deflectable element connected to oppose the action of the differential-pressure device. The system also includes means for developing a first effect varying with the deflection of the element, means responsive to such effect for adjusting the element to restore the device to its undeflected condition and for developing a second effect varying with the adjustment of the deflectable element, means for developing a third effect varying with the fuel-mass flow to the engine and means responsive jointly to the second and third effects for controlling the fuel-mass flow to the engine.

Further in accordance with the invention, a system for measuring the mass flow of an elastic fluid in a conduit comprises a deflectable differential-pressure device connected with the conduit and responsive to the fluid flow therethrough, an adjustable resilient deflectable element connected to oppose the action of the differential-pressure device, and means normally having a zero signal output for developing an electric signal varying with the deflection of the element. The system also includes means responsive to such developed signal for adjusting the deflectable element to restore the differential-pressure device to its undeflected condition, the adjustment of such element being representative of the fluid-mass flow in the conduit.

For a better understanding of the invention, together with other and further objects thereof, reference is had to the following description taken in connection with the accompanying drawings while its scope will be pointed out in the appended claims.

Referring now to the drawing, the single figure represents, partially schematically, a complete fuel-air ratio control system embodying the invention and including an elastic fluid-mass flow measuring system constituting one feature of the invention.

Referring to the drawing, there is represented a system for controlling the fuel-air ratio of the input of an internal combustion engine under variable operating conditions and comprising an air-intake conduit 10 and fuel-intake conduit 11 for the engine. A throttle 8 is disposed in the conduit 10 and connected to be actuated by a lever 9 through a mechanism 9a. The fuel-air ratio control system includes a system for measuring the mass flow of the air, which is an elastic fluid, in the intake conduit 10. This system comprises a deflectable differential-pressure device 12 connected with the conduit 10 and responsive to the air flow therethrough. The device 12 may be of any conventional type and is shown as comprising an expansible bellows 12a, the interior of which is connected through a conduit 12b with the throat of a Venturi element 10a in the conduit 10. The bellows 12a is enclosed within a chamber 12c connected by way of conduit 12d to the inlet side of the venturi 10a.

The air-mass flow measuring system also includes an adjustable resilient deflectable element, such as a spiral spring 13, the inner end of which is secured to a rotatable shaft 13a and the outer end of which is connected by means of a link or arm 13b to oppose the action of the differential-pressure device 12.

The air-mass measuring system also includes means for developing an effect varying with the deflection of the spring element 13, for example a normally balanced electrical network 14 including an adjustable inductor 14a and a fixed resistor 14b in parallel, and means or mechanism, represented schematically by the dashed-line 15, for adjusting the inductor 14a in accordance with the deflection of the spring element 13 by the differential-pressure device 12 to unbalance the network 14. The network 14 is connected across a suitable electrical supply circuit, such as the alternating-current circuit 16, and the midpoints of the elements 14a, 14b comprise an output circuit 14c at which there is developed an electrical signal varying in accordance with the deflection of the differential-pressure device 12 and the spring 13. In series with the resistor 14b and one side of the circuit 16 is a resistor 17 having an adjustable contact 17a adapted to be operated by a pressure-responsive device 18 having a fluid connection 18a with the conduit 10 and a resistor 19 having an adjustable contact 19a operated by a temperature-responsive device 20 having a fluid connection 20a to the air-intake conduit 10. The pressure-responsive device 18 and the temperature-responsive device 20 are shown schematically since they may be entirely conventional elements for producing mechanical displacements in response to variations in pressure and temperature, respectively. Alternatively, the compensations for variations in temperature and pressure of the air through conduit 10 may be effected by the arrangement illustrated and described in my copending application Serial No. 562,556, filed November 8, 1944. In order to eliminate any torque reaction of the variable inductor 14a on the spring element 13, the inductor 14a is preferably of the balanced type, such as described in copending application of Herbert C. Roters, Serial No. 518,060, filed January 13, 1944, now Patent No. 2,390,463, and assigned to the same assignee as the present application.

The air-mass measuring system also includes means responsive to the effect developed by the spring element 13 for adjusting the spring 13 to restore the differential-pressure device 12 to its undeflected condition. For example, this means may comprise a two-phase motor 21 having a first-phase winding 21a excited directly from the circuit 16 and a second phase winding 21b excited from an amplifier and phase-shifter unit 22 having its input terminals connected across a resistor 23 in the unbalance circuit between the midpoints of the network 14, that is, between the midpoints of the elements 14a and 14b. The motor 21 is connected to adjust or rewind spring 13 by an irreversible mechanism indicated schematically at 21c. With such an arrangement, the adjustment of the spring element 13 necessary to restore the differential-pressure device 12 to its undeflected condition is representative of the fluid-mass flow in the conduit 10 and this adjustment may be indicated by a fluid-flow indicating means actuated by the unbalance responsive means. Specifically, there may be provided an indicator 24a actuated by the motor 21 through a mechanism indicated schematically at 25 and cooperating with a suitably calibrated scale 24.

The fuel-air ratio controlling system also includes means responsive to the effect, or electrical signal, varying with the adjustment of the spring 13 for developing a second effect, also preferably an electrical signal varying with the adjustment of the spring 13, and means for developing a third effect, preferably a third electrical signal, varying with the fuel-mass flow to the engine through the intake conduit 11. These latter two means may preferably comprise a normally balanced electrical network connected to the circuit 16 and including two adjustable impedances such as voltage dividers 26 and 27 connected in parallel across the circuit 16 and provided with adjustable contacts 26a and 27a, respectively. The adjustable contact 26a of the adjustable impedance or voltage divider 26 is adjusted by the unbalance responsive means or motor 21 and may, as indicated, comprise a unitary part of the pointer 24a.

The fuel-air ratio controlling system also includes means responsive jointly to the effects represented by the positions of adjustable contacts 26a and 27a, specifically to the differential voltage between the contacts 26a, 27a representing the unbalance of the network 26, 27 for controlling the fuel-mass flow to the engine and for simultaneously adjusting the contact 27a to adjust the impedance 27 to reduce the differential voltage between the contacts 26a and 27a substantially to zero and thus rebalance the network 26, 27. This means preferably comprises a two-phase motor 28 having a first-phase winding 28a connected across the circuit 16 and a second-phase winding 28b energized through an amplifier and phase shifter 29, the input terminals of which are connected to a resistor 30 connected between the adjustable contacts 26a and 27a and thus responsive to the differential-voltage therebetween. The motor 28 actuates the adjustable contact 27a by a mechanism indicated schematically at 31 and is also connected to adjust an adjustable orifice 32a of a fuel-mass control mechanism 32 by way of mechanism indicated schematically at 34.

The fuel-mass control means 32 forms the subject matter of my copending application Serial No. 562,556, filed November 8, 1944, and assigned to the same assignee as the present application, to which reference is made for a detailed description. In brief, however, the fuel-mass control means 32 comprises the adjustable orifice 32a in the fuel-intake conduit 11 of the engine and a fluid-pressure responsive means, such as a piston 32b, subjected to the differential-pressure across the orifice 32a by means of conduits 32c and 32d and biased by means of a spring 32e. The fluid-pressure responsive means 32b develops an effect representative of the differential-pressure across the orifice 32a. Such effect may be considered as the physical displacement of piston 32b itself or the pressure admitted thereby through a port 32f and a conduit 32g to a cylinder 32h in which is disposed a piston-operated metering valve 32i, which constitutes means responsive to the fluid pressure or effect developed by the piston 32b for adjusting the flow through the conduit 11 to maintain constant the differential-pressure across the orifice 32a, thereby to determine the fuel-mass flow through the conduit 11 to the engine. Since the orifice 32a and the adjustable contact 27a are actuated in common by the motor 28, the setting of the contact 27a is representative of and varies with the adjustment of the orifice 32a and of the fuel-mass flow to the engine. The contact 27a may be provided with an extension pointer 33a cooperating with a scale 33 which, if suitably calibrated, will indicate the fuel-air ratio of the input to the engine, as explained hereinafter.

It is well known that there is an approximately square-root relationship between the differential-pressure developed across a constriction, as the venturi 10a in conduit 10, and the fluid flow through the conduit. The spring element 13 is also frequently found to have a non-linear adjustment-torque characteristic and certain of the other elements of the system likewise may have somewhat non-linear characteristics. To compensate for these non-linearities, one of the impedances, such as the voltage divider 26, is designed with a predetermined non-linear resistance-adjustment characteristic proportioned to compensate for the non-linear characteristics of one or more of the other elements; for example, it may be proportioned to have a square-root characteristic to compensate for the characteristic of the differential pressure device 12. The voltage divider 27 may be designed with a characteristic to compensate for the non-linear characteristics of other elements of the system, for example that of the venturi 10a.

It is believed that the operation of the fuel-air ratio controlling system of the invention will be apparent from the foregoing description. In brief, however, if it is assumed that the system is initially in equilibrium and that the lever 9 is then adjusted to open the throttle 8 wider to cause the engine to develop a greater power output, the increased air-mass flow through the conduit 10 increases the differential-pressure applied to the device 12 which operates through the link 13b to deflect or wind up the spiral spring 13 and simultaneously through the link 15 to adjust the inductor 14a of the network 14. The network 14 thus becomes unbalanced and the unbalanced voltage is applied by way of the circuit 14c to the amplifier and phase shifter 22 which develops and applies to the winding 21b a voltage substantially in quadrature with that of the supply circuit 16. The motor 21 thereupon rotates to adjust the spring 13, as by winding it up, to oppose the increased force developed by the differential-pressure device 12 and to restore the device 12 to its undeflected position. The inductor 14a is also restored to its initial adjustment to rebalance the network 14; that is the network 14 is balanced only when the differential-pressure device 12 is restored to its undeflected position. Therefore, the response of the system is independent of any irregularities or non-linearities in the response characteristic of the device 12. Assuming that the spring 13 has a linear adjustment-torque characteristic, the adjustment of the spring necessary to restore the device 12 to its undeflected condition is representative of the differential-pressure across the venturi 10a and thus of the air-mass flow through the conduit 10. Therefore, the connection of the motor 21 to actuate the pointer 24a is effective to indicate on the scale 24, if suitably calibrated, the air-mass flow through the conduit 10.

However, since air is an elastic fluid and the differential-pressure device 12 responds only to the volumetric flow through the conduit 10, it is preferable to include the pressure-responsive device 18 and the temperature-responsive device 20 which, through their associated adjustable resistors 17 and 19, respectively, are effected to modify the effect or electrical signal developed by the network 14 to compensate for the variations in the temperature and pressure, respectively, of the air flowing through the conduit 10. However, if the system is operating under conditions such that the temperature and pressure of the air remain approximately constant, the compensating devices 18 and 20 and their associated resistors 17 and 19, respectively, may be omitted.

The motor 21 is also effective to adjust the pointer 26a of the voltage divider 26 to develop an effect, specifically an electrical signal, representative of the air-mass flow through the conduit 10. This signal is compared with the signal at the adjustable contact 27a of the voltage divider 27 through the balancing circuit including the resistor 30 and any differential voltage developed in this circuit is applied to the amplifier and phase shifter 29 which, in turn, develops and applies to the phase winding 28b of motor 28 a voltage in quadrature with that applied to the winding 28a from the circuit 16. The motor 28 is thus responsive to the unbalance voltage of the network including the resistors 26 and 27 and is effective to readjust the contact 27a to restore the balance of this network. The motor 28 is also connected simultaneously to adjust the orifice 32a of the fuel-mass control means to adjust the fuel flow to the engine. As explained in detail in my above-mentioned copending application, the spring-biased piston 32b is effective to so control the piston metering valve 32i as to maintain a constant differential-pressure across the orifice 32a irrespective of its adjustment. Therefore, adjustment of the orifice 32a is effective to determine precisely the fuel flow to the engine through the conduit 11, irrespective of variations in the fuel supply pressure or in any back pressure developed by the engine fuel-injection apparatus.

Since the setting of adjustable contact 27a is continuously compared with the setting of the adjustable contact 26a, there is a constant functional relationship between their positions which is dependent upon the relative displacement-resistance characteristics of the two resistors 26 and 27. The position of the pointer 33a associated with the scale 33 indicates the setting of the contact 27a and if the scale 33 is suitably calibrated, represents the air-mass flow to the engine or the fuel-mass flow to the engine or the fuel-air ratio. Preferably, as described above, the characteristic of the voltage divider resistor 27 is tapered or otherwise predetermined to take into account any desired non-linear fuel-air ratio for different air-mass flows to the engine, that is for different horsepower settings, and the scale 33 is calibrated to give an indication directly of the resultant fuel-air ratio of the input to the engine.

While there has been described what is at present considered to be the preferred embodiment of the invention, it will be apparent to those skilled in the art that various changes and modifications may be made therein without departing from the spirit or scope of the invention.

What is claimed as new is:

1. A system for controlling the fuel-air ratio of the input to an internal combustion engine under variable operating conditions comprising, an air intake conduit for said engine, a deflectable differential-pressure device connected with said conduit and responsive to the air flow therethrough, an adjustable resilient deflectable element connected to oppose the action of said device, means for developing a first effect varying with the deflection of said element, means responsive to said effect for adjusting said element to restore said device to its undeflected condition and for developing a second effect varying with the adjustment of said element and representative of the air-mass flow to the engine, means for developing a third effect varying with the fuel-mass flow to the engine, and means responsive jointly to said second and third effects for controlling the fuel-mass flow to the engine.

2. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, means responsive to said effect for adjusting said element to restore said device to its undeflected condition and for developing a first electrical signal varying with the adjustment of said element and representative of the air-mass flow to the engine, means for developing a second electrical signal varying with the fuel-mass flow to the engine, and means responsive jointly to said first and second signals for controlling the fuel-mass flow to the engine.

3. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, a normally balanced electrical network including two adjustable impedances, means responsive to said effect for adjusting said element to restore said device to its undeflected condition and for adjusting one of said impedances in accordance with the adjustment of said element, the adjustment of said one of said impedances being representative of the air-mass flow to the engine, and means responsive to the unbalance of said network for controlling the fuel-mass flow to the engine and for adjusting the other of said impedances to rebalance said network.

4. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, a normally balanced electrical network including two adjustable impedances, means responsive to said effect for adjusting said element to restore said device to its undeflected condition and for adjusting one of said impedances in accordance with the adjustment of said element, the adjustment of said one of said impedances being representative of the air-mass flow to the engine, and means responsive to the unbalance of said network for controlling the fuel-mass flow to the engine and for adjusting the other of said impedances to rebalance said network, one of said impedances having a non-linear adjustment-impedance characteristic proportioned to compensate for non-linear characteristics of other elements of the system.

5. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, an electrical supply circuit, a pair of voltage dividers connected across said circuit each provided with an adjustable contact, means responsive to said effect for adjusting said element to restore said device to its undeflected condition and for adjusting one of said contacts, the adjustment of said one of said contacts being representative of the air-mass flow to the engine, and means responsive to the differential voltage between said contacts for controlling the fuel-mass flow to the engine and for adjusting the other of said contacts to reduce said differential voltage substantially to zero.

6. A system for controlling the fuel-air ratio of the input to an internal combustion engine under variable operating conditions comprising, an air-intake conduit and a fuel-intake conduit for said engine, a deflectable differential-pressure device connected with said air-intake conduit and responsive to the air flow therethrough, an adjustable resilient deflectable element connected to oppose the action of said device, means for developing a first effect varying with the deflection of said element, means responsive to said effect for adjusting said element to restore said device to its undeflected condition and for developing a second effect varying with the adjustment of said element and representative of the air-mass flow to the engine, an adjustable orifice in said fuel-intake conduit, fluid-pressure-responsive means connected with said fuel-intake conduit for developing a third effect representative of the differential fluid pressure across said orifice, means responsive to said third effect for maintaining said differential pressure constant to determine the fuel-mass flow to the engine, means for developing a fourth effect varying with the adjustment of said orifice, and means responsive jointly to said second and fourth effects for adjusting said orifice.

7. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, means responsive to said effect for adjusting said element to restore said device to its undeflected condition and for developing a second effect varying with the adjustment of said element and representative of the air-mass flow to the engine, means for developing a third effect varying with the fuel-mass flow to the engine, means responsive jointly to said second and third effects for controlling the fuel-mass flow to the engine, and means for indicating the magnitude of said third effect and calibrated to represent the fuel-air ratio of the input to the engine.

8. A system for controlling the fuel-air ratio of the input to an internal combustion engine under variable operating conditions comprising, an air-intake conduit for said engine, a deflectable differential-pressure device connected with said conduit and responsive to the air flow therethrough, an adjustable resilient deflectable element connected to oppose the action of said device, means for developing a first effect varying with the deflection of said element, a normally balanced electrical network including two adjustable impedances, means responsive to said effect for adjusting said element to restore said device to its undeflected condition and for adjusting one of said impedances in accordance with the adjustment of said element, the adjustment of said one of said impedances being representative of the air-mass flow to the engine, means responsive to the unbalance of said network for controlling the fuel-mass flow to the engine and for adjusting the other of said impedances to rebalance said network, and means for indicating the setting of said other of said impedances and calibrated to represent the fuel-air ratio of the input to the engine.

9. A system for measuring the mass flow of an elastic fluid in a conduit comprising, a deflectable differential-pressure device connected with said conduit and responsive to the fluid flow therethrough, an adjustable resilient deflectable element connected to oppose the action of said differential-pressure device, an electrical network normally having a zero signal output, means for unbalancing said network to a degree varying with the deflection of said element, and means responsive to the unbalance of said network for adjusting said element to restore said device to its undeflected condition, the adjustment of said element being representative of the fluid-mass flow in said conduit.

10. A system for measuring the mass flow of an elastic fluid in a conduit comprising, a deflectable differential-pressure device connected with said conduit and responsive to the fluid flow therethrough, an adjustable resilient deflectable element connected to oppose the action of said differential-pressure device, an electrical network normally having a zero signal output and including an adjustable inductor, means for adjusting said inductor to a degree varying with the deflection of said element, and means responsive to the unbalance of said network for adjusting said element to restore said device to its undeflected condition, the adjustment of said element being representative of the fluid-mass flow in said conduit.

11. A system for measuring the mass flow of an elastic fluid in a conduit comprising, a deflectable differential-pressure device connected with said conduit and responsive to the fluid flow therethrough, an adjustable resilient deflectable element connected to oppose the action of said differential-pressure device, means normally having a zero signal output for developing an electrical signal varying with the deflection of said element, and motor means responsive to said signal for adjusting said element to restore said device to its undeflected condition, the adjustment of said element being representative of the fluid-mass flow in said conduit.

12. A system for measuring the mass flow of an elastic fluid in a conduit comprising, a deflectable differential-pressure device connected with said conduit and responsive to the fluid flow therethrough, an adjustable resilient deflectable element connected to oppose the action of said differential-pressure device, means normally having a zero signal output for developing an electrical signal varying with the deflection of said element, means responsive to said signal for adjusting said element to restore said device to its undeflected condition, the adjustment of said element being representative of the fluid-mass flow in said conduit, and means responsive to the temperature of the fluid in said conduit for modifying said signal.

13. A system for measuring the mass flow of an elastic fluid in a conduit comprising, a deflectable differential-pressure device connected with said conduit and responsive to the fluid flow therethrough, an adjustable resilient deflectable element connected to oppose the action of said differential-pressure device, means normally having a zero signal output for developing an electrical signal varying with the deflection of said element, means responsive to said signal for adjusting said element to restore said device to its undeflected condition, the adjustment of said element being representative of the fluid-mass flow in said conduit, and means responsive to the pressure of the fluid in said conduit for modifying said signal.

DAVID W. MOORE, Jr.

REFERENCES CITED

The following references are of record in the file of this patent:

UNITED STATES PATENTS

| Number | Name | Date |
|---|---|---|
| 1,291,056 | Mapelsden | Jan. 14, 1919 |
| 1,525,807 | Gibson | Feb. 10, 1925 |
| 1,641,195 | Roucka | Sept. 6, 1927 |
| 1,682,602 | Dawley | Aug. 28, 1929 |
| 1,968,539 | Rydberg | July 31, 1934 |
| 2,131,486 | Spitzglass | Sept. 27, 1938 |
| 2,136,900 | Woolley | Nov. 15, 1938 |
| 2,151,941 | Rydberg | Mar. 28, 1939 |
| 2,275,317 | Ryder | Mar. 3, 1942 |
| 2,281,411 | Campbell | Apr. 28, 1942 |
| 2,291,048 | Lichtenstein | July 28, 1942 |
| 2,319,363 | Wunsch | May 18, 1943 |
| 2,343,451 | Garretson | Mar. 7, 1944 |
| 2,371,040 | Fisher et al. | Mar. 6, 1945 |
| 2,372,766 | Colvin et al. | Apr. 3, 1945 |
| 2,395,648 | Teichert | Feb. 26, 1946 |
| 2,396,031 | Udale et al. | Mar. 5, 1946 |
| 2,441,468 | Brownscombe | May 11, 1948 |

FOREIGN PATENTS

| Number | Country | Date |
|---|---|---|
| 442,497 | Great Britain | May 3, 1934 |